(12) United States Patent
Grabiner et al.

(10) Patent No.: US 9,914,574 B2
(45) Date of Patent: Mar. 13, 2018

(54) TEMPERATURE CONDITION INDICATORS FOR PERISHABLE PRODUCT CONTAINERS

(71) Applicant: TEMPTIME CORPORATION, Morris Plains, NJ (US)

(72) Inventors: Frederick R. Grabiner, Livingston, NJ (US); Dene H. Taylor, New Hope, PA (US); Thaddeus Prusik, Stroudsburg, PA (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 102 days.

(21) Appl. No.: 14/502,438

(22) Filed: Sep. 30, 2014

(65) Prior Publication Data

US 2015/0090623 A1 Apr. 2, 2015

Related U.S. Application Data

(60) Provisional application No. 61/885,293, filed on Oct. 1, 2013, provisional application No. 61/925,513, filed on Jan. 9, 2014.

(51) Int. Cl.
*B65D 51/24* (2006.01)
*B65D 25/34* (2006.01)
*B65D 25/28* (2006.01)
*G01K 11/12* (2006.01)
*B65D 43/02* (2006.01)
*B65D 25/20* (2006.01)
*G01K 3/04* (2006.01)

(52) U.S. Cl.
CPC ......... *B65D 51/245* (2013.01); *B65D 25/205* (2013.01); *B65D 25/34* (2013.01); *B65D 43/02* (2013.01); *G01K 3/04* (2013.01); *G01K 11/12* (2013.01); *G01K 2207/04* (2013.01)

(58) Field of Classification Search
CPC .... B65D 51/254; B65D 25/205; B65D 25/34; G01K 3/04; G01K 11/12
USPC .................. 374/106, 161; 116/216
See application file for complete search history.

(56) References Cited

U.S. PATENT DOCUMENTS

| 3,782,195 | A | * | 1/1974 | Meek | A47G 19/2227 |
| | | | | | 116/207 |
| 4,846,095 | A | * | 7/1989 | Emslander | G01K 11/06 |
| | | | | | 116/206 |
| 5,678,925 | A | * | 10/1997 | Garmaise | A47G 19/2227 |
| | | | | | 206/459.1 |
| 6,913,160 | B2 | * | 7/2005 | Bourreau | B65D 41/0492 |
| | | | | | 206/459.1 |
| 6,957,623 | B2 | * | 10/2005 | Guisinger | G01K 11/06 |
| | | | | | 116/206 |
| 7,343,872 | B2 | | 3/2008 | Taylor et al. | |
| 7,571,695 | B2 | * | 8/2009 | Taylor | G01K 3/005 |
| | | | | | 116/216 |
| 8,122,844 | B2 | | 2/2012 | Smith et al. | |
| 8,128,872 | B2 | | 3/2012 | Lentz et al. | |
| 8,430,053 | B2 | | 4/2013 | Taylor et al. | |

(Continued)

*Primary Examiner* — Chun Cheung
(74) *Attorney, Agent, or Firm* — K&L Gates LLP

(57) ABSTRACT

Disclosed herein is a temperature condition indicator disposed upon the top surface of a lid or cap for a container or on the container or vial for a perishable product, such as a food or a drug composition. The indicator can change appearance when exposed to a temperature condition, such as a freezing event.

19 Claims, 10 Drawing Sheets

(56) References Cited

U.S. PATENT DOCUMENTS

| | | | |
|---|---|---|---|
| 2003/0213715 A1* | 11/2003 | Klepac | B65D 5/4204 206/438 |
| 2009/0145912 A1* | 6/2009 | Hyde | B65D 81/3802 220/592.26 |
| 2014/0048010 A1 | 2/2014 | Smith et al. | |

* cited by examiner

TEMPERATURE CONDITION INDICATORS FOR PERISHABLE PRODUCT CONTAINERS

CROSS REFERENCE TO RELATED APPLICATIONS

This application claims the benefit of U.S. provisional patent application No. 61/885,293, filed Oct. 1, 2013 and U.S. provisional patent application No. 61/925,513, filed Jan. 9, 2014, the entire disclosures of which are incorporated herein by reference.

FIELD

Described herein are environmental history indicators for injection vial lids, such as freeze indicators, time temperature indicators, and the like for a location such as on the lid, on the side of a vial or on the bottom of a vial.

SUMMARY

This disclosure generally relates to vials or vial components that incorporate a condition or condition change indicator. Vials for a perishable product are described comprising: a lid comprising a temperature condition indicator; a label comprising a temperature condition indicator; or a bottom comprising a temperature condition indicator.

Some embodiments include a container for a perishable product comprising: a vial configured to hold the perishable product; a lid, removably coupled to the vial, and having an inner surface configured to contact the vial, and a top surface opposite the inner surface; and a temperature condition indicator, disposed upon the top surface; wherein the temperature condition indicator comprises: a cup; an indicator substance, contained in the cup, that will irreversibly change appearance when exposed to a temperature condition; and a cover, disposed over the cup, wherein the cover is sufficiently transparent that a change in appearance of the indicator substance that results from exposure to the temperature condition is detectable through the cover.

In one embodiment, a freeze indicator formulation is contained in a reservoir in the top or lid of the vial. The top or lid can have a clear covering to allow viewing of the freeze indicator formulation.

In another embodiment, a freeze indicator formulation is contained within a self adhesive indicator affixed to the lid, the body or the bottom of the vial.

In one embodiment, the bottom of the vial comprises a reservoir, wherein the reservoir contains a freeze indicator formulation.

In another embodiment, a label like structure is attached to the vial lid and the label like structure is flexible blister having a volume that is less than about 5 microliters.

In still another embodiment, a label like structure is attached to vial body and the label like structure is flexible blister having a volume that is less than about 5 microliters. In still other embodiments, a label like structure is attached to vial label and the label like structure is a flexible blister having a volume that is less than 5 microliters.

In further embodiments, a label like structure is attached to vial bottom and the label like structure is a flexible blister having a volume that is less than 5 microliters.

In one embodiment, the temperature condition indicator used is a binary indicator. In other embodiments, the indicator is clearly visible and the indicator can be applied off label to the vial body without using label area.

In other embodiments, the liquid temperature condition indicator is not a binary indicator, so that quantitative damage to a product in the vial can be detected.

The liquid temperature condition indicator can indicate a temperature condition at about or below the freezing temperature of the solution contained in the vial or at about or above the freezing temperature of the solution contained in the vial.

In one embodiment, additional temperature condition indicators are included unattached to vial so that a temperature condition indicator can be applied in the event that the vial top indicator is removed.

In one embodiment, the temperature condition indicator can undergo a color change to denote a temperature condition. In another embodiment, the temperature condition may not be detected by a color change of the temperature condition indicator.

In some embodiments, the temperature condition indicator comprises a liquid media, a gel media, a solid state media, a mixture of a liquid and a gel media, a mixture of a gel and a solid state media, or a mixture of a liquid and a solid state media.

Some embodiments include a container for a perishable product comprising: a vial configured to hold the perishable product and a lid, removably coupled to the vial. The vial and/or lid contains at least one indicator substance that will irreversibly change appearance when exposed to a changed condition such as temperature.

Some embodiments include a pharmaceutical product comprising a pharmaceutical composition contained within a container or vial comprising a lid and or vial includes a temperature condition indicator or indicator substance.

Some embodiments include a food product comprising a food contained within a container comprising a lid and/or container having a temperature condition indicator or indicator substance.

DETAILED DESCRIPTION

Figure 1:
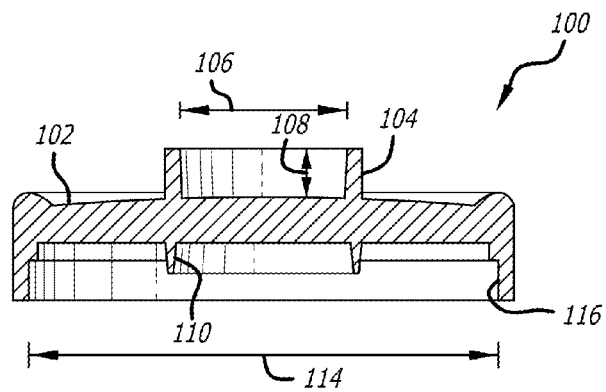
FIG. 1 depicts an example embodiment of a freeze indicator lid.

Generally, a condition or condition change indicator can be disposed upon the top surface of a lid or cap for a container for a perishable product, such as a food or a drug composition. Such a condition indicator comprises: a cup, an indicator substance, and a cover. Typically, the indicator substance will irreversibly change appearance when exposed to a condition. The indicator substance is normally contained in the cup. A cover can be disposed over the cup and may be sufficiently transparent that a change in appearance of the indicator substance that results from exposure to the condition is detectable through the cover.

Likewise, a condition or condition change indicator can be disposed upon the circumferential surface of a vial for a perishable product. Even further still, a condition or condition change indicator can be disposed upon the bottom surface of a vial for a perishable product. For example, a condition or condition change indicator can be disposed within a cavity formed within the bottom of a vial or in a container attachable to the bottom of a vial.

An indicator substance as described herein can be a solid, liquid, gel, semi-solid, colloid, or the like that can irreversibly change state, color, transparency, or a combination thereof upon introduction to a predetermined condition. An irreversible change can be a change in state, color, transparency, or a combination thereof that once the change occurs, the prior state, color, or transparency cannot be reverted back to. For example, a clear colloid may become opaque or white when subjected to a predetermined condition. In some embodiments, the indicator substance goes from clear to opaque or darkly colored, or from opaque or darkly colored to clear, when the indicator is subjected to the predetermined condition.

A predetermined condition can be a desired or undesired condition for which indication that such a condition has been met can be determined. For example, a predetermined condition may be freezing, boiling, a particular temperature or range of temperatures, a low temperature threshold, a high temperature threshold, a thermal history, exposure to light, exposure to a particular wavelength of light such as UV light, exposure to liquid such as humidity, exposure to excess pressure, subject to contamination such as bacteria, or the like, or a combination thereof. In one embodiment, the predetermined condition is freezing.

The labeling required for vaccines and other drugs and/or therapeutic agents that are stored in injection vials can occupy the greater part of the sides of small volume vials, leaving no space for an indicator. Some embodiments, describe an indicators located on the circumferential surface of a vial.

The indication top seal described herein can retain many different capabilities of a commercial top seal. In one embodiment, an indication top seal can keep a septum clean and sterile (if so chosen) from manufacturing to end use. In another embodiment, an indication top seal can indicate that a vial has not been tampered with (it has remained sealed). In another embodiment, an indication top seal can be used to color-code different vaccines, batches, etc. The indication top seals described herein can include any or all of the above capabilities along with the ability to be used in essentially the same assembly and attachment equipment.

An example freeze indicator lid 100 is illustrated in FIG. 1. Freeze indicator lid 100 includes a substantially circular lid 102 and a freeze indicator cup 104. Freeze indicator cup 104 can have any shape which allows a user to determine the status of the freeze indicator located inside it. Example shapes can include circular, square, triangular, or any other rectilinear or curved shape. Indicator cup 104 can be located anywhere on freeze indicator lid 100. In one embodiment, indicator cup 104 is located in the center of freeze indicator lid 100. If circular, the cup can have an internal (e.g., not including wall thickness) diameter 106 of about 1 mm, about 2 mm, about 3 mm, about 4 mm, about 5 mm, about 6 mm, about 7 mm, about 8 mm, about 9 mm, about 10 mm, at least about 2 mm, at least about 4 mm, between about 2 mm and about 10 mm, or between about 4 mm and about 10 mm. The cup can also have a depth 108 of about 0.1 mm, about 0.5 mm, about 1 mm, about 1.5 mm, about 2 mm, about 3 mm, about 4 mm, at least about 0.1 mm, at least about 0.5 mm, between about 0.1 mm and about 4 mm, between about 0.1 mm and about 2 mm, or between about 0.5 mm and about 2 mm.

Figure 2:
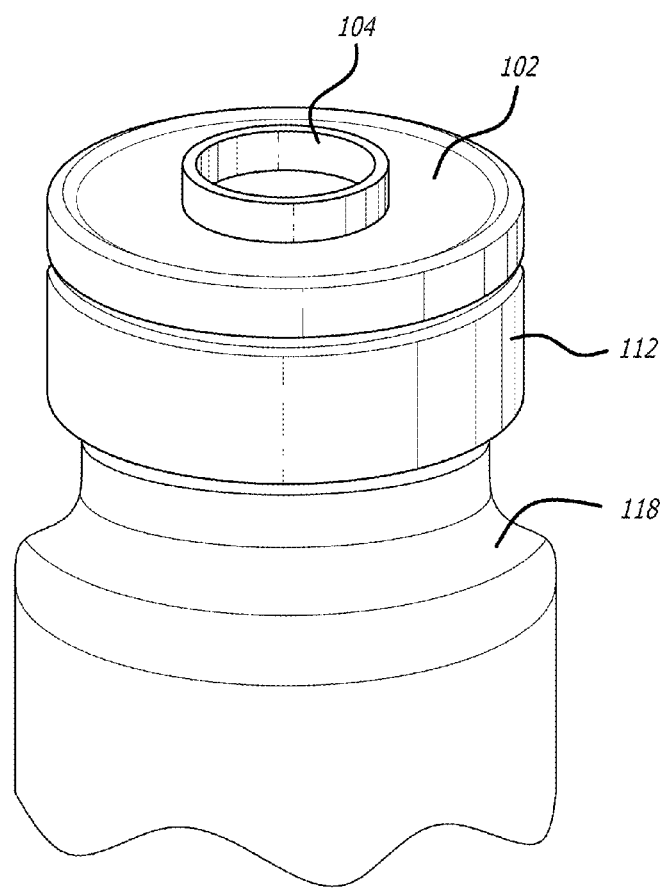
FIG. 2 depicts an example embodiment of a freeze indicator lid that includes a crimpable attachment point which can be used to attach a freeze indicator lid to a vial cap.

Freeze indicator lid 100 further includes a crimpable attachment point 110 which can be used to attach freeze indicator lid 100 to a vial cap 112 (FIG. 2). The diameter 114 of freeze indicator lid 100 can be varied to substantially match outer diameter of vial cap 112 or any other useful vial cap. In some embodiments, a freeze indicator lid as described herein can be attached to a conventional aluminum vial cap.

Freeze indicator lid 100 can also include protection ridge 116 that can prevent interference with crimpable attachment point 110 when mated with vial cap 112. Protection ridge 116 can span the circumference of freeze indicator lid 100 or can alternatively span only a portion thereof.

Once freeze indicator lid 100 is mated with vial cap 112, the entire assembly can be attached to vial 118 by crimping or otherwise attaching vial cap 112 to vial 118. Vial 118 can be any size vial that is compatible with a vial cap and flip-top lid assembly. Vials can include injection vials, unit dose vials, or the like. Vial 118 can be formed of glass, polymer or the like.

Figure 3:
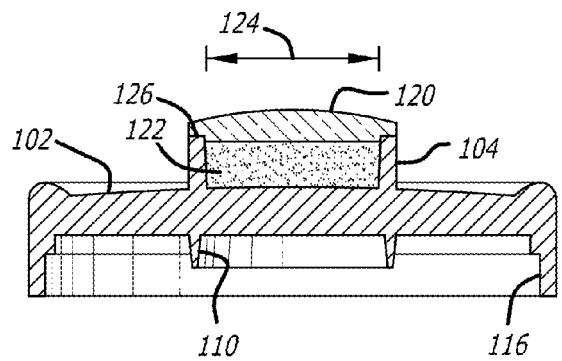
FIG. 3 depicts an example embodiment of a freeze indicator lid that includes a closure that is used to seal an indicator substance within an indicator cup.

Freeze indicator lid 100 further includes a closure 120 that is used to seal an indicator substance 122 within indicator cup 104 (FIG. 3). As closure 120 lies between indicator substance 122 and a user, closure 120 can be substantially transparent. For example, sufficiently transparent can be greater than about 80% transparent, greater than about 90% transparent, greater than about 95% transparent, greater than about 96% transparent, greater than about 97% transparent, greater than about 98% transparent, or greater than about 99% transparent. Closure 120 can be formed as a lens or as a window. Such a lens or window can be sufficiently transparent to allow color changes that meet color change standards to be readily observed.

Closure 120 can have any shape that can seal the contents of indicator cup 104. If indicator cup 104 is circular, closure 120 can have a complimentary shape. The lens or window can be any size that allows indication whether the indicator has activated or not. In some embodiments, closure 120 can have a diameter 124 of about 1 mm, about 2 mm, about 3 mm, about 4 mm, about 5 mm, about 6 mm, about 7 mm, about 8 mm, about 9 mm, about 10 mm, at least about 2 mm, at least about 4 mm, between about 2 mm and about 10 mm, or between about 4 mm and about 10 mm in diameter.

In some embodiments, the lens or window may have an area of about 0.5 mm$^2$ to about 80 mm$^2$, about 3 mm$^2$ to about 75 mm$^2$, about 15 mm$^2$ to about 75 mm$^2$, or about 30 mm$^2$ to about 75 mm$^2$.

In one example embodiment, as illustrated in FIG. 3, indicator cup 104 has a circular shape and closure 120 is a transparent circular lens with a sealing ridge 126 that can both attach closure 120 to indicator cup 104 and seal indicator substance 122 within indicator cup 104. Closure 120 can be attached to indicator cup 104 using an adhesive, a friction fit, or a combination thereof. They may also be joined securely by ultrasonic welding.

When the indicator substance is not being viewed directly from above, the indicator substance can be more visible if the top of the closure (e.g., lens) is convex rather than flat. The convex nature of the closure top can vary by application. In some embodiments, the top can be more complex in order to magnify the indicator substance, thereby acting as a magnifying glass.

The volume of indicator substance used in a given indicator can be about 1 μL, about 2 μL, about 3 μL, about 4 μL, about 5 μL, about 6 μL, about 7 μL, about 8 μL, about 9 μL, about 10 μL, at least about 0.1 μL, at least about 1 μL, at least about 3 μL, at least about 5 μL, between about 1 μL and about 200 μL, between about 1 μL and about 100 μL or about 150 μL, between about 1 μL and about 50 μL, between about 1 μL and about 20 μL, between about 1 μL and about 10 μL, or between about 4 μL and about 6 μL.

When closed and sealed, the volume of indicator substance 122 that can fit within indicator cup 104 can vary depending on the dimensions of the cup, the closure, or both. The volume of indicator substance 122 can be about 1 μL, about 2 μL, about 3 μL, about 4 μL, about 5 μL, about 6 μL, about 7 μL, about 8 μL, about 9 μL, about 10 μL, at least about 0.1 μL, at least about 1 μL, at least about 3 μL, at least about 5 μL, between about 1 μL and about 200 μL, between about 1 μL and about 100 μL or about 150 μL, between about 1 μL and about 50 μL, between about 1 μL and about 20 μL, between about 1 μL and about 10 μL, or between about 4 μL and about 6 μL.

Figure 4:
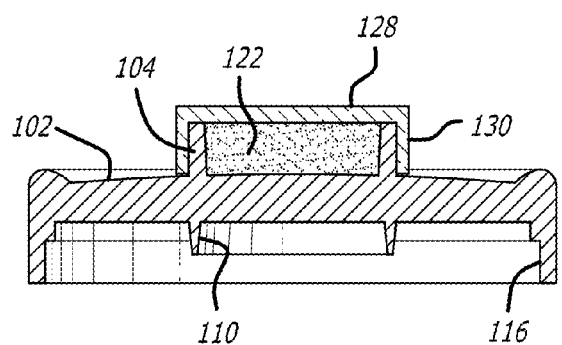
FIG. 4, depicts an example embodiment of a freeze indicator lid that includes a closure that is in the shape of a lid with a top and circumferential ridge that fits over and seals the indicator substance within the cup.

In another embodiment, as illustrated in FIG. 4, closure 120 can be in the shape of a lid with a top 128 and circumferential ridge 130 that fits over and seals the indicator substance within the cup. In this embodiment, both top 128 and circumferential ridge 130 can be substantially transparent or only top 128 may be transparent.

The closure illustrated in FIG. 4 may have ridges, grooves or barbs that mate with counterpart ridges, grooves or barbs on the cup, so they may be difficult to separate once closed. For example as illustrated in FIGS. 5A and 5B, ridge 132 on the interior surface 134 of circumferential ridge 130 can mate with a complimentary ridge 136 on outer surface 138 of indicator cup 104.

Figure 5A:
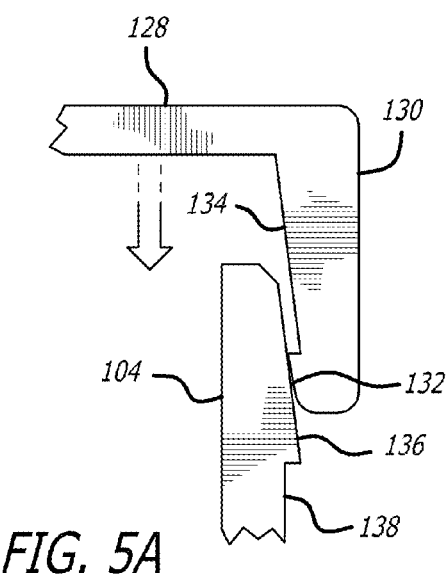
FIGS. 5A and 5B demonstrate how a ridge on an interior surface of a circumferential ridge can mate with a complimentary ridge on an outer surface of an indicator cup.
Figure 5B:
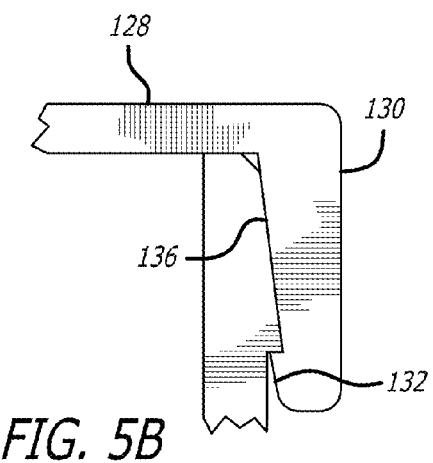

In one embodiment, the outer surface diameter of indicator cup 104 decreases from the base to the rim, and the inner surface of the closure increases from its top to its lip (See FIGS. 5A and 5B). In this embodiment, on being brought together the closure can fit readily over the cup and the two become self-aligned. This also brings the two surfaces tightly together providing a strong seal when closing is complete.

In one embodiment, when an indicator cup is cylindrical the inner end surface of the closure can be flat or slightly bulged so that on mating with the filled cup the air in the top part can escape before the liquid enters the gap between the parts. In such an embodiment, trapped air and included bubbles can be minimized within the indicator substance.

It may be desirable to minimize bubbles included with the sealed indicator substance. Minimizing bubbles can improve the aesthetic aspects of the indicator, as well as ensure better hiding of the background. Bubbles can be prevented if the inside surface of a closure is horizontal. If the internal surface of the closure is horizontal and it has a low surface tension, for example, that of polypropylene, bubbles can be minimized when the parts are assembled. In other configurations the internal surface of the closure can have a surface energy which promotes wetting by the indicator dispersion.

Figure 6A:
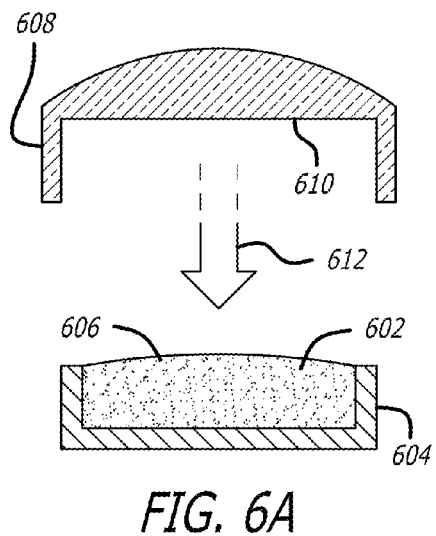
FIGS. 6A and 6B depict how an example embodiment of a freeze indicator having a closure with a flat inner surface can be assembled to minimize bubble formation in the indicator.
Figure 6B:
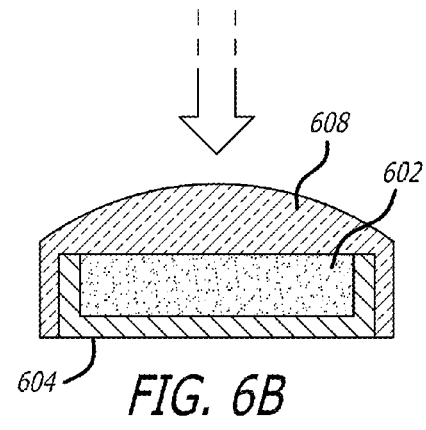

For example, as illustrated in FIGS. 6A and 6B, if sufficient indicator substance 602 is charged into cup 604 to cause a slight excess and dome 606, and closure 608 has a flat or horizontal interior surface 610, if closure 608 is carefully aligned above cup 604 and the two are brought together in a smooth motion 612, bubbles can be minimized or eliminated completely. Such a procedure of closure can force air above the indicator substance out through the gap between the two parts.

Figure 6C:
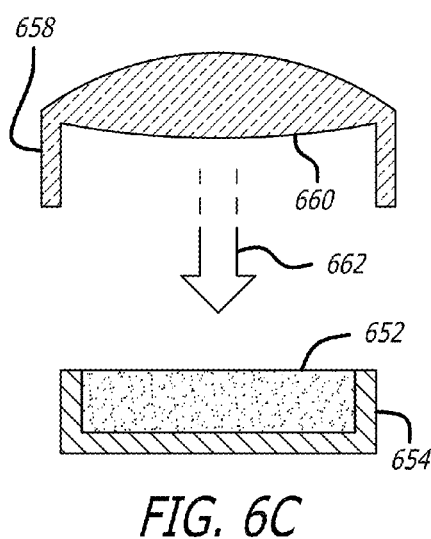
FIGS. 6C and 6D depict how an example embodiment of a freeze indicator having a closure with a convex inner surface can be assembled to minimize bubble formation in the indicator.
Figure 6D:
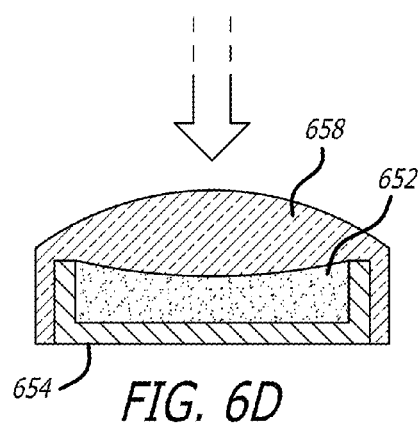

As illustrated in FIGS. 6C and 6D, a convex inner surface of the closure can help to prevent air bubbles. For example, inner surface 660 of closure 658 can be convex or inwardly curved and cup 654 can be filled with indicator substance 652. If closure 658 is aligned with cup 654, and the two are brought together in a smooth motion 662, some indicator substance 652 can be forced out through the gap between the two parts. The can reduce or avoid trapping air bubbles, and the convex shape of the cover may help to magnify any text or symbols under the indicator substance.

Figure 7A:
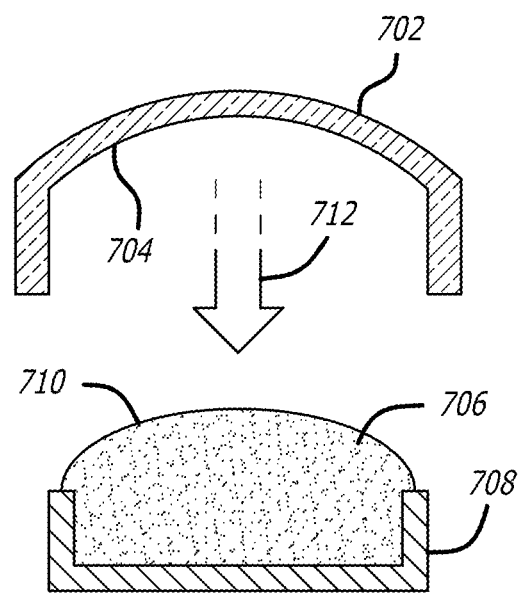
FIGS. 7A and 7B depict how an example embodiment of a freeze indicator having a closure with a concave or domed inner surface flat inner surface can be assembled.
Figure 7B:
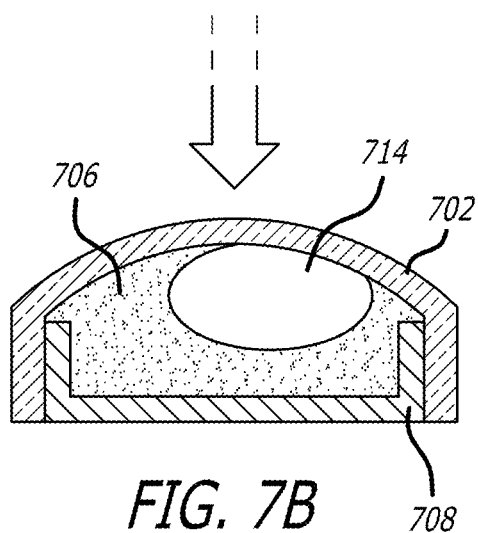

If the inner surface of the closure is domed, air may be trapped when assembled and thereby introduce bubbles in the indicator substance. For example as illustrated in FIGS. 7A and 7B, closure 702 has a concave or domed inner surface 704. In order to attempt to prevent trapping air in the sealed enclosure, sufficient indicator substance 706 is charged into cup 708 to cause an excess and dome 710 to match inner surface 704. As closure 702 is slowly brought together 712 with cup 708, air 714 may get trapped as bubbles. In other embodiments, a domed inner surface may prevent bubbles. With proper automation the excess can be negligible.

In one embodiment, a predetermined condition can be a desire to know when a vial has been subjected to humidity above a particular percentage such as 65% relative humidity.

In another embodiment, a predetermined condition can be a desire to know when a vial has been subjected to sunlight because the vial requires no exposure to sunlight.

In one embodiment, a predetermined condition can be a desire to know when a vial has been subjected to freezing temperatures. In such an embodiment, the indicator substance can be an essentially transparent freeze-sensitive colloid, such as is used for a FREEZECHECK™ or FREEZEMarker® indicator. Upon freezing, the colloid becomes opaque.

In one embodiment, the lens on a vial cap will appear to have a similar color to indicator lid which is the bottom of indicator cup. Upon freezing, the colloid becomes opaque and obscures the bottom of the container, and so the lens appears white.

If color change of an indicator substance is required, the color of the indicator lid or container housing the indicator can be important. For example, colors that might skew the visual color of the indicator substance may be avoided. Likewise, for indicator substances that transition from clear to opaque white, a white indicator lid or container should be avoided to prevent confusion of state. Further, still, a deep red or pink indicator lid or container would not be suitable colors if the indicator was a gold colloid.

In other embodiments, should an indicator substance contain a freeze sensitive liquid that changes from one color to a different color on freezing or exposure to freezing conditions, then that color change can be reflected in the appearance of the indicator. That is, it can be readily obvious that the indicator, and therefore the contents of the vial, have been exposed to potentially damaging conditions and appropriate action should be taken. Such a change can allow lids or indicator containers as described herein to be produced in any color.

Dimensions of an indicator substance needed can require different sized (and volumed) indicator cups or containers. The color change in an indicator substance can be obvious at arms length, in both strong and weak light. However, in some embodiments, the change is not obvious and can require special equipment to read the state of the indicator. In the absence of an adjacent reference or contrast, a difference of 0.4 optical density units can be reliable, when either the starting or ending point is white or close to white.

In other embodiments, a change may be more or less intense. The color in this type of indicator substance can be produced as a liquid, so Beer's law can be applied to relate the color to the thickness of the liquid, or depth of the indicator as defined here. When the color change intensity is increased, the depth can be proportionally reduced. And if the change is weaker, the indicator may be deeper. As an example, the colloid used in the FREEZECHECK™ or FREEZEMarker® indicator at a depth of 2 mm allows the background to be seen in the unexposed indicator, yet obscures it thoroughly when the indicator has been exposed to freezing conditions.

In some embodiments, good visibility of the indicator in ordinary lighting at arms length can be achieved with a square or circle indicator cup with a diameter of about 4 mm, or a similar width if rectangular, with suitable immediate contrast. Larger or smaller indicators may be appropriate in different circumstances or with different changes in contrast between the fresh and exposed states.

Figure 8:
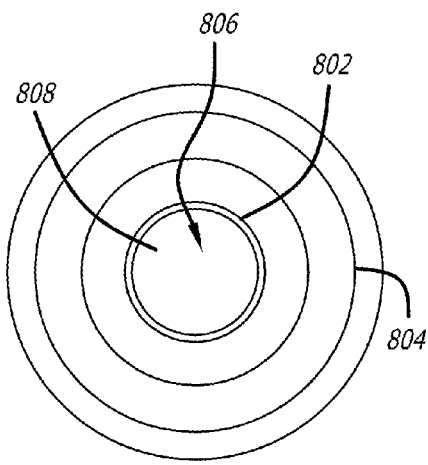
FIGS. 8 and 9 illustrate how a change in color or transparency can be visualized.
Figure 9:
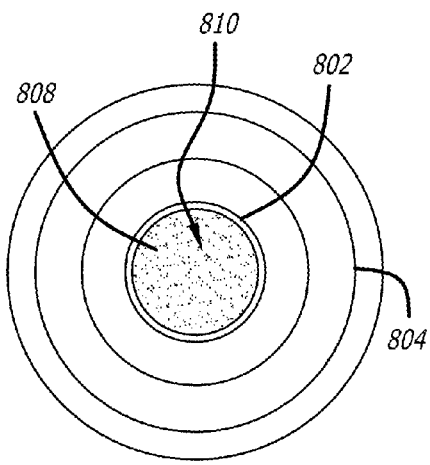

For example, as illustrated in FIGS. 8 and 9, a change in color or transparency can be visualized. Here, cup 802 is centered on lid 804. A transparent indicator substance 806 is seen through a transparent closure 808. Here, whatever the color of lid 804 is will be visualized through the transparent indication substance 806. However, when the indicator is triggered, it becomes opaque. When opaque, the color of lid 804 can no longer be completely seen or seen at all through opaque indicator 810.

Indicators dependent upon the freezing of water to induce a permanent visible change may require a minimum content of nucleating agent to ensure reliable freezing within the parameters chosen for the indicator. If the volume is reduced the reliability can decrease and so the product specification is commensurately relaxed. For example, in one embodiment, an indicator substance has a volume of about 40 µL, about 20 µL, about 10 µL, or about 5 µL, or less, and a relatively tight specification.

Depending on the indicator substance used for indication in the herein described systems, the composition used to form the indicator cup, indicator lid, indicator container, and/or the closure can change. For example, indicators that require water to perform can require indicator cups, indicator lids, indicator containers, and/or closures that prevent substantial amounts of permeation of the water. In other embodiments, indicators made from flexible films, may require a water vapor barrier layer, which may be provided as a coating, a co-extrusion or a laminate.

Indicator cups, indicator lids, indicator containers, and/or closures can generally be formed of a polymeric material. However, glass, metals, and metal alloys can also be used. Also, polymer, glass, or metals coated with polymers can be used. Metals and metal alloys that can be used to form indicator lids, indicator containers, and/or indicator cups include, but are not limited to stainless steel, aluminum, brass, etc. Suitable polymers used to form and/or coat indicator lids, indicator containers, and/or indicator cups can include, but are not limited to poly(L-lactic acid), polycaprolactone, poly(lactide-co-glycolide), poly(ethylene-vinyl acetate), poly(hydroxybutyrate-co-valerate), polydioxanone, polyorthoester, polyanhydride, poly(glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters) (e.g., PEO/PLA), polyurethanes, silicones, polyesters, polyolefins, polyisobutylene and ethylene-alphaolefin copolymers, acrylic polymers and copolymers, ethylene-co-vinylacetate, polybutylmethacrylate, vinyl halide polymers and copolymers (e.g., polyvinyl chloride), polyvinyl ethers (e.g., polyvinyl methyl ether), polyvinylidene halides (e.g., polyvinylidene fluoride and polyvinylidene chloride), polyacrylonitrile, polyvinyl ketones, polyvinyl aromatics (e.g., polystyrene), polyvinyl esters (e.g., polyvinyl acetate), acrylonitrile-styrene copolymers, ABS resins, polyamides (e.g., Nylon 66 and polycaprolactam), polycarbonates, polyoxymethylenes, polyimides, polyethers, polyurethanes, polypropylene, cellophane, and carboxymethyl cellulose. In one embodiment, the indicator cup and the indicator lid can be formed of polypropylene which can be a moderately acceptable water barrier. In other embodiments, the indicator container can be formed of polypropylene.

The parts described herein (e.g., indicator lids, indicator cups, containers, closures, etc.) can be incorporated into the design of the mold used in the injection molding process to produce items of the commercial designs. However, because of the small size of the parts involved, it may be convenient to produce them in strings, sheets or webs, joined by threads of the polymer so that they can be readily oriented for the step where they are combined with the flip top component.

In one embodiment, the indicator cup, indicator lid, and closure can be formed together, and the closure is attached to the lip of the indicator cup by a thin plastic strip which acts as a hinge.

Figure 10:
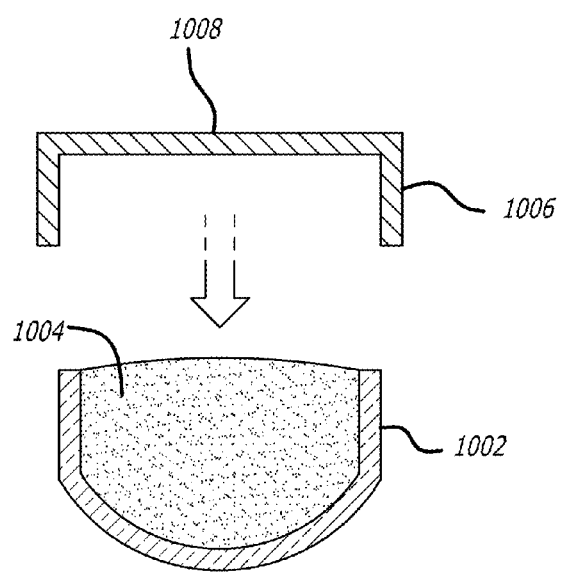
FIG. 10 illustrates how an example embodiment of an indicator can be formed and filled upside down and then bonded to an indicator lid.
Figure 11:
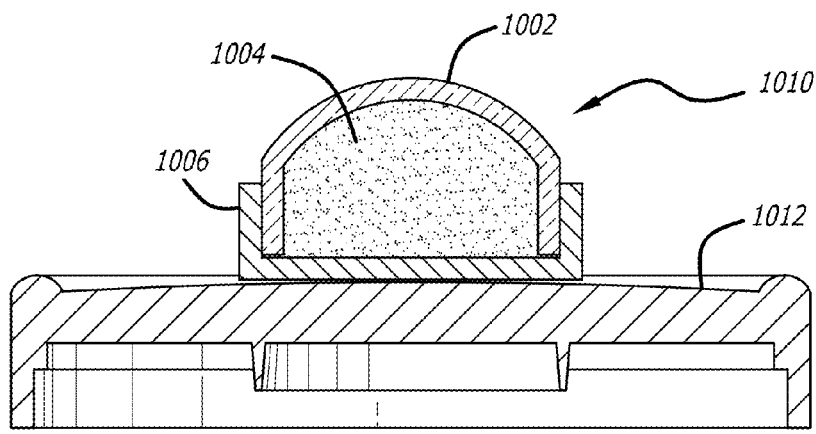
FIG. 11 illustrates how an example embodiment of an assembled indicator can be bonded to a commercial vial lid.

Other embodiments can have different structural designs. For example as illustrated in FIG. 10, an indicator can be formed and filled upside down and then bonded to an indicator lid. Closure 1002 can be inverted and filled with indicator substance 1004. Then, a cup 1006 with a flat bottom surface 1008 is attached to the inverted top of closure 1002 thereby encasing indicator substance 1004. Then, as illustrated in FIG. 11, an assembled indicator 1010 can be bonded to a commercial vial lid 1012 using any method known in the art such as but not limited to gluing.

Figure 12:
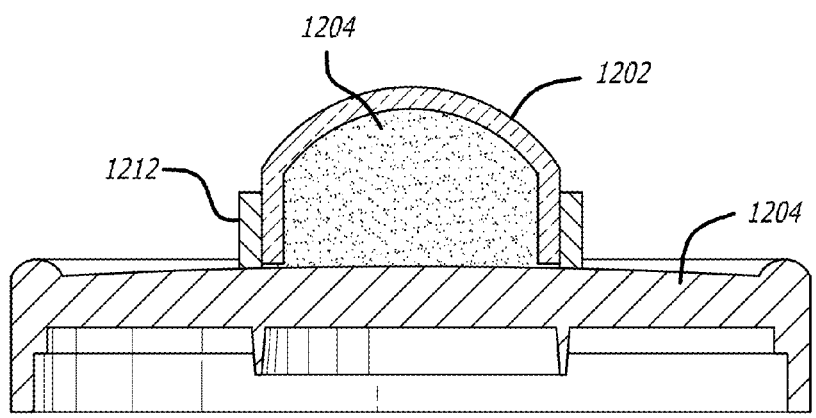
FIG. 12 illustrates how an example embodiment of an indicator can be assembled.

In another embodiment, as illustrated in FIG. 12, closure 1202 can be inverted and filled with indicator substance 1204. Then, an inverted indicator lid including an indicator cup 1212 is attached to the inverted top of closure 1202 thereby encasing indicator substance 1204.

Figure 15:
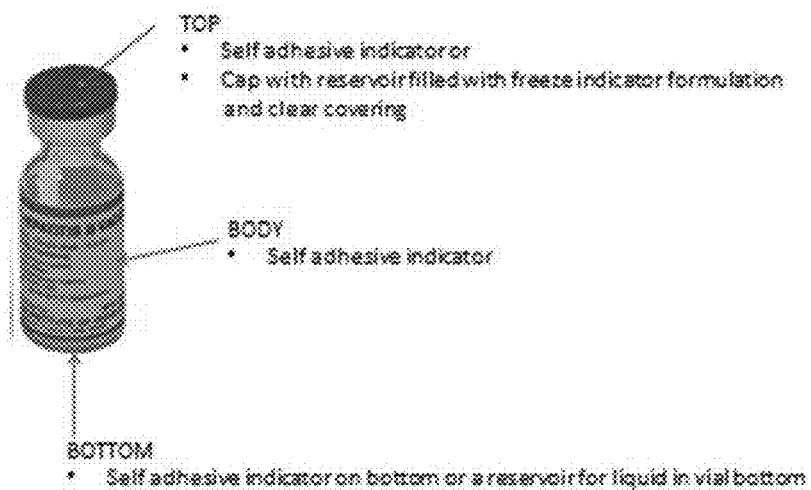
FIG. 15 illustrates exemplary locations for housing an indicator substance on a vial and/or lid.
Figure 16:
FIG. 16 is an example embodiment of a vial with a reservoir in the bottom of the vial for a temperature condition indicator.
Figure 17:
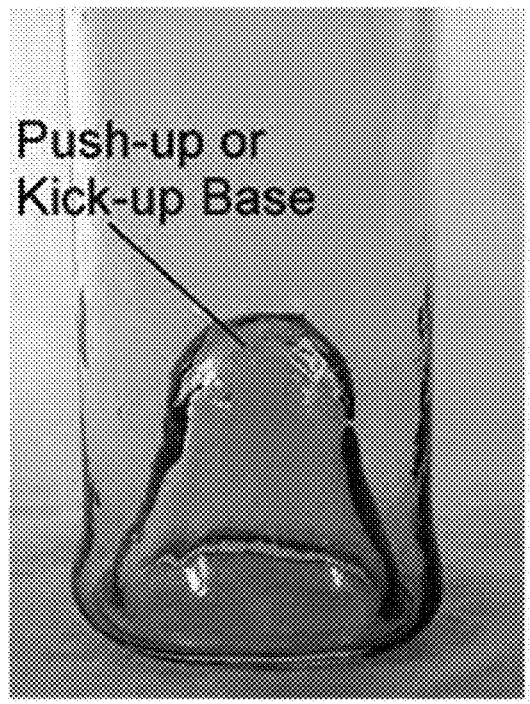
FIG. 17 is an example embodiment of a vial with a reservoir in the bottom of the vial for a temperature condition indicator.
Figure 18:
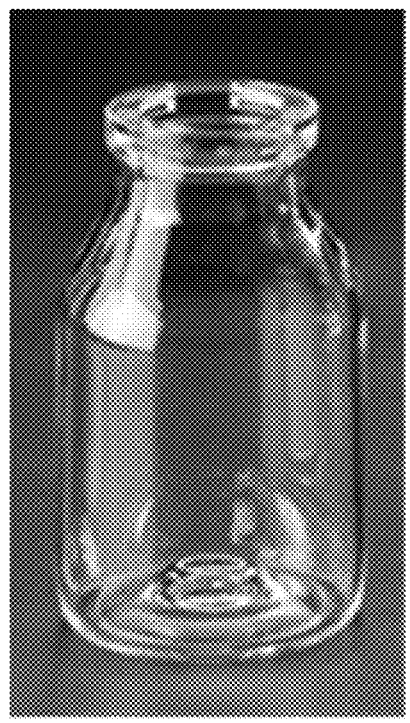
FIG. 18 is an example embodiment of a vial with a reservoir in the bottom of the vial for a temperature condition indicator.
Figure 19:
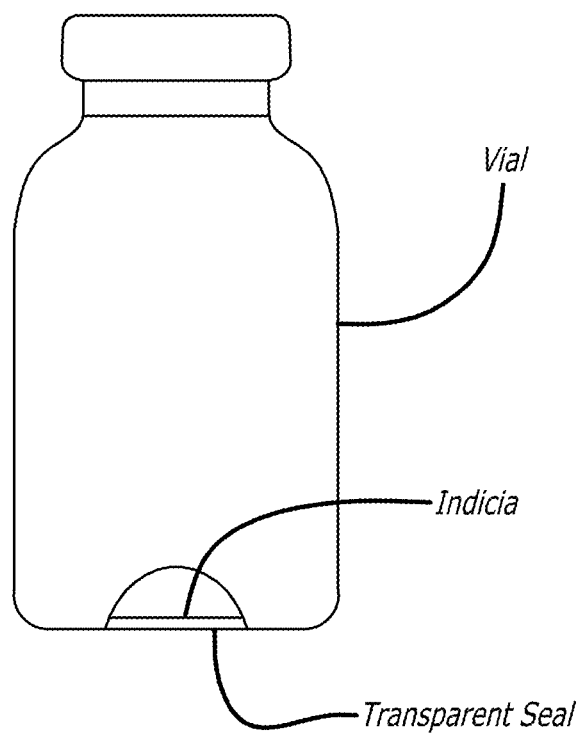
FIG. 19 is an example embodiment of a vial with a reservoir in the bottom of the vial for a temperature condition indicator.

FIG. 15 illustrates possible locations that can be configured to place an indicator as described herein. As indicated, an indicator can be located on the top or lid of a vial or container, the body of a vial or container, and/or the bottom of a vial or container.

Further embodiments, are illustrated in FIGS. 16-19 wherein a vial includes a reservoir in the bottom of a vial. A temperature condition indicator can have an indicator formulation in the reservoir. For some vials, a bottom portion of the reservoir can be sealed off, e.g. with a transparent seal.

In some embodiments, if the condition or condition change indicator is disposed on the bottom of a vial, it does not disturb the functioning or storage of the vial. For example, in some embodiments, the vial can stand on its bottom with the condition or condition change indicator can disposed there.

If attachable to the bottom of a vial, such a condition indicator comprises: a cup, an indicator substance, and a cover. Typically, the indicator substance will irreversibly change appearance when exposed to a condition. The indicator substance is normally contained in the cup. A cover can be disposed over the cup and may be sufficiently transparent that a change in appearance of the indicator substance that results from exposure to the condition is detectable through the cover.

In some embodiments, a vaccine vial monitor may be important for vaccine prequalification and the freeze indicator would used in addition to the Vaccine Vial Monitor for cumulative heat exposure. In some embodiments, freeze indicator technology adapted to trigger at a variety of temperatures may provide miniaturization of a freeze indicator on each vial. In other embodiments, a freeze indicator can provide an early warning of risk if a vial is exposed to potentially damaging cold temperatures.

In some embodiments, design factors can vary. For example, currently all chemical based freeze indicators are a liquid/gel in either a flexible (blister/label like) or a rigid (glass) container system.

In one embodiment, a liquid containing label-like structure (≤5 µL flexible blister) can be provided to be attached to top lid, body or vial bottom. In other embodiments, an indicator can include a liquid contained in a flip-off vial lid. In still other embodiments, an indicator can include a liquid contained in vial bottom and sealed therein.

In some embodiments, the indicators described herein such as freeze indicators can function as binary go/no go responses when exposed to freezing temperatures or other condition changes described herein.

In one embodiment, the indicator change can be easy to identify and interpret by a user. A user can be a health care worker such as one that needs to administer the contents of the indicated vial.

In some embodiments, the indicators and containers described herein can integrate easily into manufacturing operations. Further, the indicators and containers described herein can have little to no overall impact on final vial labeling efficiency and speed, little to no increase in package size, and/or can be cost effective.

As described, the indicator can be placed on the top of the vial such as on or in the lid, on the body of the vial such as on the circumferential face of the vial, and/or on or in the bottom of the vial.

When placed on the top of the vial, the indicator can be a self adhesive type indicator can be a lid with a reservoir filled with freeze indicator formulation and clear covering. In one embodiment, such a system is described in Provisional Application Ser. No. 61/885,293 Filed: Oct. 1, 2013 which is incorporated in its entirety.

In a top configuration, the indicator can be clearly visible. However, a top configuration may not be suitable for all presentations and is generally removed once vial is opened.

Further, a top configuration can include a lid filled with indicator formulation or include a self adhesive indicator that can be applied to a lid prior to final packaging. In such an embodiment, there can be minimal operational impact. However, a top configuration may require an additional step, may need to verify that a lid with self adhesive indicator will not interfere with final crimping process, and/or may need to verify that indicator integrity is not compromised by any process steps after final lid assembly.

In other embodiments, a top configuration can include a lid filled with indicator. This lid may require no or only negligible dimensional change to lid height. In some embodiments, the lid, dispensing equipment, and viewing lid sealing may need to be designed and developed.

In some embodiments, a standard vial lid can be adequate for use with small volume self adhesive indicators. These small volume self adhesive indicators may only produce a slight increase in overall height of a lid assembly.

In a body placement configuration, the indicator can be clearly visible. In one embodiment, such a system is described in Provisional Application Ser. No. 61/911,871 Filed: Dec. 4, 2013 which is incorporated in its entirety.

In a body placement configuration, the indicators can be sufficiently flexible to wrap a curved surface without flagging, can be sufficiently rigid to detach from a liner, can contain an indicator for the intended life of the housed substance, does not interact with housed substance or interfere with housed substance's functionality, can be accurate, can be reliable, can have a long shelf life, can function under a wide range of conditions, can be inexpensive, can be manufactured in large volumes at high speed, and can be usable with high speed labeling machinery.

In some embodiments, current label real estate may be used if an indicator label is attached to the body. In some embodiments, the indicator can be applied "off label" onto a vial body with no label area used. Whether applied over an existing label or off label, both approaches may require an additional production step. With body placement of indicators, standard sized and shaped vials can be used with no modification required. Application of an indicator to the body of a vial can be integrated into current operations as an additional labeling step.

In a bottom placement configuration, the indicator can be visible when viewed from the bottom. A bottom placed indicator can be a self adhesive indicator applied on a vial bottom or a reservoir for liquid in vial bottom sealed therein. A bottom placement configuration does not take any space on vial label or vial body. Further, a bottom placement configuration may violate World Health Organization specifications for Vaccine Vial Monitor placement if applicable. Otherwise, bottom placement configuration may not affect the vialed product.

A bottom placement configuration may require vial designs for integration of either a self adhesive indicator applied on a vial bottom or a reservoir for liquid in vial bottom. For example, a vial can be developed with a slight bottom contour change to accept a label. In another example, a vial can be developed with a slight bottom reservoir in order to house an indicator substance. In the case of a reservoir, a viewing lid can seal an indicator substance into the reservoir. In such examples, vial design, dispensing equipment, and/or viewing lid sealing systems may need to be designed and developed.

If a bottom reservoir is used, in order to avoid contamination of the vialed product, the reservoir may need to be filled on fully and sealed vial. Filling of a sealed vial may require substantial production line changes and may be costly.

If a bottom self adhesive indicator is used, it can be applied to bottom prior to final filling/packaging with minimal operational impact.

Any suitable indicator material can be used with the indicators described herein. Some examples of useful indicator materials are described in U.S. Pat. Nos. 8,430,053; 6,957,623; 8,128,872; 7,343,872; 7,571,695; and 8,122,844, all of which are incorporated for reference for all disclosure related to freeze indicator materials or other kinds of indicator materials, as well as U.S. patent application Ser. No. 13/968,895, filed Aug. 16, 2013 and 61/839,658, filed Jun. 26, 2013, both of which are incorporated for reference for all disclosure related to freeze indicator materials or other kinds of indicator materials.

Typically, a freeze indicator can include a two or three-phase emulsion or dispersion (referred to herein as an "indicator dispersion") that is affected by freezing. For example, freezing can cause coagulation or coalescence of a dispersed phase. As a result of the coagulation or coalescence, the appearance of the indicator material can change. This change may have to do with the physical or optical properties of the phases themselves, such as a change in light scattering of a dispersed phase, or transfer of a material, such as a colorant or an opacifying agent, from one phase to another.

An indicator material may contain a reactive agent that changes color upon reaction. For example, a dispersed phase may comprise two or more discreet types of particles or droplets. A first type of particle or droplet could contain a first reactive agent, and a second type of particle or droplet could contain a second reactive agent. The first and second reactive agent can react with one another to produce a change in appearance, such as a color change. Thus, when the different types of particles or droplets in the dispersed phase coalesce or coagulate upon freezing, the first and the second reactive agent can react to produce the change in appearance, such as a color change, that can alert a user that a freezing event has occurred. In some embodiments, an indicator material can comprise water and a hydrophobic material.

Some indicator materials can comprise a colorant. A colorant in an indicator dispersion may be of any useful color, such as red, orange, yellow, blue, green, violet, or black. For indicator dispersions that are water-in-oil (w/o) emulsions, water-in-oil-in-water emulsions (w/o/w), or oil-in-water-in-oil (o/w/o), a dispersed aqueous phase can contain a colorant that is water-soluble. For example, a colorant may have a water solubility of at least about 10 mg/mL, at least about 50 mg/mL, or at least about 100 mg/mL. It may also be helpful for the colorant to have a substantially greater solubility in water than in oil. For example the colorant can be at least 2 times, at least 5 times, at least 10 times, at least 50 times, at least 100 times, at least 1000 times, or at least 10,000 times more soluble in water than in oil by weight. It may also be helpful for a water-soluble colorant to have a low oil solubility. Low oil solubility may avoid or reduce possible migration of the colorant into an oil phase, which may cause premature coloration of the indicator dispersion. For example, the colorant may have a solubility less than about 10 mg/mL, less than about 1 mg/mL, or less than about 0.1 mg/mL. Examples of suitable colorants include basic dyes such as methylene blue, malachite green, etc.; acid dyes such as Naphthalene Red EA, Naphthalene Scarlet 4R, Naphthalene Orange G; Crystal Violet, etc.; acid-base indicators, such as phenolphthalein, gentian violet, leucomalachite green, thymol blue, methyl yellow, bromophenol blue, congo red, methyl orange, bromocresol green, methyl red, azolitmin, bromocresol purple, bromothymol blue, phenol red, neutral red, napthophthalein, cresol red, thymophthalein, etc. Basic dyes can have extinction coefficients an order of magnitude higher than acid dyes.

For o/w, o/w/o, or w/o/w dispersions or emulsions, a dispersed oil phase may contain a colorant that is soluble in oil or hydrophobic solvents. For example, a colorant may have a solubility of at least about 10 mg/mL, at least about 50 mg/mL, or at least about 100 mg/mL in oil or a hydrophobic solvent. It may also be helpful for the colorant to have a substantially greater solubility in water than in oil or a hydrophobic solvent. For example the colorant can be at least 2 times, at least 5 times, at least 10 times, at least 50 times, at least 100 times, at least 1000 times, or at least 10,000 times more soluble in water than in oil or a hydrophobic solvent by weight. For dispersed oil phases containing a colorant, it may also be helpful for the colorant to have a low water solubility. Low water solubility may avoid or reduce possible migration of the colorant into an aqueous phase, which may cause premature coloration of the indicator dispersion. For example, the colorant may have a solubility of less than about 10 mg/mL, less than about 1 mg/mL, or less than about 0.1 mg/mL in water.

An indicator dispersion may contain any useful amount of a colorant. The proportion of colorant can be decreased to reduce color before a temperature condition, such as a freezing event, is met, if present, or can be increased to increase color after a temperature condition, such as a freezing event, is met, if desired. In some embodiments, the amount of colorant in the indicator dispersion is at least about 0.005%, at least about 0.002%, at least about 0.01%, at least about 0.05%, or up to about 0.05%, up to about 0.1%, up to about 1%, about 0.01% to about 1%, about 0.01% to about 5%, or about 0.01% to about 10%, based upon the weight of the colorant in the total weight of the dispersion.

An aqueous phase can include any suitable aqueous liquid such as water. One or more water-miscible liquids having a melting point higher than that of water may optionally be included in the aqueous phase. For example, deuterium oxide (D2O), deuterated water (HOD), or a mixture of deuterium oxide and deuterated water, may be combined with or substituted for light water. In some embodiments, an aqueous phase may be 90% to nearly 100% deuterated water and/or deuterium oxide. The melting point of an aqueous phase may be adjusted to correspond to a temperature condition to be monitored. Adjustment of the melting point may be carried out by suitable selection of aqueous ingredients and their proportions.

An oil or hydrophobic phase can comprise any suitable hydrophobic material, such as a hydrophilic solid or liquid, including a liquid that is a water barrier, or tends to repel or not absorb water, or has a lack of affinity for water. In some embodiments, the hydrophobic liquid may have a water solubility that is less than about 10%, less than about 1%, less than about 0.01%, less than about 0.001%, or less than about 0.0001%. It may also be helpful to have a hydrophobic material that is unreactive with other components of the indicator dispersion, including the colorant, or with any housing or containment material that the temperature condition indicator may employ to contain the indicator dispersion in the context of the indicator dispersion.

Use of a hydrophobic material having a relatively high refractive index, such as greater than about 1.45 or about 1.5, can help provide a more opaque, or lighter colored dispersion in some cases. Vegetable oils, such as olive oil or sunflower oil, may have refractive indexes of about 1.47. Mineral oil has a refractive index of about 1.48. Hydrogenated terphenyl oils have a refractive index of about 1.52.

Some examples of useful oils or hydrophobic liquids include hydrocarbons such as heptane, octane, nonane, decane, undecane, dodecane, tridecane, hexadecane and the like, either linear or branched; aromatics such as toluene, xylene, etc., mineral oil, terphenyl oils, etc.; esters, including vegetable oils, such as soybean oil, cottonseed oil, linseed oil, rapeseed oil, castor oil, sunflower oil, olive oil, kernel oil, peanut oil, corn oil, canola oil, coconut oil, hazelnut oil, avocado oil, almond oil, arachis oil, safflower oil, maize oil, soybean oil, caraway oil, rosemary oil, peppermint oil, eucalyptus oil, sesame oil, coriander oil, lavender oil, citronella oil, juniper oil, lemon oil, orange oil, clary sage oil, nutmeg oil, tea tree oil, etc., liquid fatty acid esters, such as liquid fatty acid esters of lauric acid, palmitic acid, stearic acid, etc.; silicon oils, such as siloxanes, polysiloxanes, cyclopolysiloxanes, dimethicone, etc.; heteroatom functionalized hydrocarbons, including haloaromatic compounds such as halogenated aromatic compounds, phenols, alkoxyaromatics, perflouroalkanes, etc. A mixture of two or more oils can also be used. One suitable terphenyl oil is available under the product code MCS 2811 from Solutia, St. Louis Mo. Some further suitable hydrophobic liquids are described in Taylor U.S. Pat. No. 8,430,053, which is incorporated by reference herein for all it describes related to hydrophobic liquids.

Use of a water-in-oil-in-water emulsion may allow a reduced amount of oil to be used as compared to temperature condition indicators based on an oil-in-water emulsion. Low oil or hydrophobic phase may provide some advantages for some indicator compositions. For example, a lower oil temperature condition indicator may have better response characteristics, such as more consistent mixing of the active phase and the base phase at a given temperature. Higher oil may in some instances adversely affect heat conductivity or may impede the spread of crystallization through the aqueous phases. In some embodiments, the hydrophobic phase may be about 0.1% to about 40%, 0.5% to about 20%, about 0.1% to about 10%, or about 1% to about 5% of the total weight of the indicator dispersion.

One method of reducing hydrophobic liquid or oil content may be to have a high load of a dispersed aqueous phase in an intermediate oil or hydrophobic phase of a w/o/w emulsion. For example, the weight ratio of dispersed aqueous phase to hydrophobic phase may approach or even exceed 1:1 (aqueous active phase:hydrophobic phase), such as at least about 1:10, at least about 1:5, at least about 1:4, at least about 1:3, at least about 1:2, at least about 1:1, up to about 1:2, about 1:1, about 2:1, about 1:5 to about 2:1, about 1:4 to about 2:1, or about 1:2 to about 2:1.

For freeze indicators, an indicator dispersion may include an ice nucleant to help overcome supercooling and provide a freeze response at a temperature closer to the melting point of the dispersion medium than would occur if the ice nucleant is not present. An ice nucleant can reduce the effect of supercooling, elevate the freezing temperature of the active and/or aqueous base phase, and therefore of the indicator dispersion, and narrow the difference between the melting point of the freezing point of the indicator dispersion.

Useful ice nucleants include inorganic ice nucleants and proteinaceous ice nucleants derived from microorganisms. Some examples of useful inorganic ice nucleants include silver iodide, cold-precipitated silver iodide/silver bromide mixtures, and copper sulfide. An example of a useful proteinaceous ice nucleant is SNOWMAX™ Snow Inducer, a freeze-dried proteinaceous material available from Johnson Controls Inc., Milwaukee Wis. Some suitable ice nucleants are also described in Taylor U.S. Pat. No. 8,430,053, which is incorporated by reference herein for all it describes with respect to ice nucleants. Any useful amount of ice nucleant may be used, such as about 0.1% to about 5% or about 0.2% to about 2% by weight.

Freeze indicators that employ a proteinaceous ice nucleant can include a protein stabilizer in the indicator dispersion to stabilize the ice nucleant against thermal or other degradation, if desired. Some examples of suitable protein stabilizers include formaldehyde, glutaraldehyde ($CHOCH_2CH_2CH_2CHO$), and other dialdehydes having more than 10 carbon atoms. Some suitable protein stabilizers are also described in Taylor U.S. Pat. No. 8,430,053, which is incorporated by reference herein for all it describes with respect to protein stabilizers. Any useful amount of protein stabilizer may be used, such as about 0.01% to about 1%, or about 0.05% to about 0.5% by weight.

If desired, a biocide may be included in an indicator dispersion that employs a proteinaceous ice nucleant to prevent microbial spoilage. Certain protein stabilizers, for example glutaraldehyde and other dialdehydes, can also serve as biocides, when used in an effective concentration. Other biocides may also be used.

To help maintain the stability of the indicator dispersion, an indicator dispersion may include a dispersion stabilizer. Some examples of suitable dispersion stabilizers include surfactants, such as anionic surfactants, cationic surfactants, zwitterionic surfactants, non-ionic surfactants or combinations thereof. In addition to those described above, in some embodiments, surfactants can include fatty acid salts, linear alkyl benzene sulfonates, dialkyl phosphates, linear alcohol sulfates, alkylphenol ethoxylates, sulfonated alkylphenol ethoxylates, fatty acid ester ethoxylates, ethylene oxide propylene oxide block copolymers, fatty acid sulfonates, betaines, quaternary ammonium salts. In some embodiments, Span 80 (a non-ionic surfactant within HLB number of 4.3, also known as Arlacel 80 [1,4-anhydro-6-O-[(9Z)-9-octadecenoyl]-D-glucitolp may be useful to stabilize the aqueous active phase in the hydrophobic phase. In some embodiments, Tween 80 (a non-ionic surfactant within our HLB number of 15, also known as polysorbate 80 [3,6-anhydro-2,4,5-tris-O-(2-hydroxyethyl)-1-O-{2-[(9Z)-9-octadecenoyloxy]ethyl]hexitol]) may be useful to stabilize the hydrophobic phase in the aqueous base phase. In some embodiments, the dispersion stabilizer may be sodium stearate, sodium dodecyl sulfate, ammonium lauryl sulfate, sodium laurel phosphate, betaine, lauryl amido propyl dimethyl betaine, dodecyl trimethyl ammonium chloride, benzalkonium chloride, sorbitan monolaurate, and oleyl alcohol.

In other embodiments, so called Pickering emulsifiers may be used either exclusively or in addition to those already delineated. These are solid particulates with appropriately modified surface chemistry. For example hydrophobically surface modified silica nanoparticles, such as Aerosil R972 (Degussa Corporation) and the like may be used to make an initial water-in-oil emulsion that is then converted into the w/o/w emulsion in a second step with a different surface modified particle. An example of such a particle is fumed silica whose surface has been modified by adsorption or chemisorption to give the right balance of hydrophilicity and hydrophobicity. Many different materials may be adsorbed onto the surface of appropriate particles including surfactants. Useful Pickering emulsifiers are not limited to silica particles. In fact, many different particulates, of any 3 dimensional shapes, such as spherical, platelet, irregular etc., may be used including, but not limited to colloidal alumina, colloidal yttria, colloidal zirconia, etc.

Other stabilizers may include water-soluble or water absorbing polymers such as poly(vinylpyrrolidone); polysaccharide derivatives, such as cellulose derivatives, including carboxymethylcellulose, hydroxypropylmethylcellulose, etc., hyaluronic acid derivatives, etc.; water-soluble acrylics, such as polyacrylic acid, polymethacrylic acid, etc.; polyethylene oxides; starches; guar; alginates; chitosan; etc. Any useful amount of dispersion stabilizer may be used, such as about 0.1% to about 10% or about 0.5% to about 5% by weight.

Some further dispersion stabilizers are also described in Taylor, U.S. Pat. No. 8,430,053 (Taylor '053), which is incorporated by reference herein for all it describes with respect to dispersion stabilizers. Any useful amount of dispersion stabilizer may be used, such as about 0.1% to about 10% or about 0.5% to about 5% by weight.

Optionally, if a dispersion stabilizer is present, an indicator dispersion may include a destabilizer to facilitate low-temperature destabilization of the indicator dispersion. A low-temperature destabilizer may promote or enhance coagulation of a freeze indicator dispersion at freezing temperatures, without unacceptably impairing the warm temperature stability properties of the dispersion. A low-temperature destabilizer can be a concentration-sensitive destabilizing or coagulating agent, for example, and ionic compound or compounds, or another suitable compound or compounds such as a high molecular weight compound. The destabilizing action of the low-temperature sensitive destabilizer can depend upon the concentration of the destabilizer aqueous liquid. Generally, although not necessarily, a temperature stabilizer also present with a low-temperature destabilizer is employed.

Examples of low-temperature destabilizers include salts, such as inorganic salts, monovalent salts, and multivalent salts. Some examples of suitable salts include chlorides, sulfates, nitrates, and carboxylates of potassium, sodium, ammonium, calcium, magnesium, and mixtures thereof.

Other materials that can be employed as low-temperature destabilizers include high molecular weight cationic, anionic, zwitterionic and uncharged polymers having a weight average molecular weight of about 1,000 Da to about 100,000 Da. Some examples of polymers useful as low-temperature destabilizers include polyacrylamides, polyvinyl alcohols, polyvinyl pyrrolidones, and poly acrylic acids. Some useful polymers may be water-soluble, and two more such polymers may be employed in a given indicator dispersion. Some suitable the stabilizers are also described in Taylor '053, which is incorporated by reference herein for all it describes with respect to stabilizers.

A low-temperature destabilizer, if employed, may be selected for its compatibility with a particular dispersion stabilizer present in an indicator dispersion. To illustrate, a polymeric destabilizer employed with an ionically stabilized indicator dispersion can carry an opposite charge to the charge carried by the indicator dispersion. For example, the cationic polymer including quaternary ammonium segments can be used to destabilize a stabilized indicator dispersion that employs an anionic stabilizer.

In some embodiments, an indicator dispersion may comprise, or consist essentially of, one or more aqueous phases, one or more hydrophobic or oil phases, and one or more optional components, wherein each optional component is a colorant, a solute, a surfactant, an acid, a base, a buffer, an ice nucleant, a protein stabilizer, the dispersion stabilizer, a low-temperature destabilizer, or a biocide.

In some embodiments, an indicator dispersion may comprise a mixture of water, latex, nucleating agent, and stabilizing agents which is translucent prior to exposure to a threshold temperature, such as a freezing temperature, and is transformed upon being subjected to the threshold temperature to render a substantially consistent opaque material thus precluding visibility therethrough and thereby providing a sure visual sign that the indicator has been subjected to the predetermined temperature.

The latex includes particles having a diameter of less than about 0.05 microns and is present in the material in an amount of from about 5 to 35% or about 15 weight %. The nucleating agent is present in the material in an amount of from about 0.01 to 1.0 weight percent, with a preferred weight percent of 0.025 and includes ice nucleating agents (INA) which contain a molecular structure to attract the water and which upon reaching the threshold temperature interact with the latex to form the opaque material. Also included in the latex is a material designed to thermally stabilize the INA. This material chemically locks the molecular structure of the INA so that it does not change with time and/or elevated temperature. The stabilizing material can be, for example, one in the family of dialdehydes that includes glyoxal, glutaraldehyde, and terephthalaldehyde.

The latex material can be formed from organic solid particles of a polymeric resinous material (e.g., rubber) in water. Both natural and synthetic latexes may be employed, provided the chosen latex material provides the capability of being irreversibly transformable when combined with the ice nucleating active (INA) microorganisms nucleating agent and water, preferably $D_2O$. The latex material can be acrylic, natural, nitrile, polychloroprene, paraffin, polyethylene, waxes, such as carnauba, styrene-butadiene, or vinyl pyridine based or mixtures thereof. Other potentially suitable latexes include styrene polymers, styrene/butadiene copolymers, styrene/acrylic acid copolymers, vinyltoluene/tertiarybutyl styrene copolymers, vinylidene chloride/vinyl chloride copolymers or mixtures thereof. The latex material preferably has a particle size of about 0.05 microns and is present from less than about 5 to about 30 weight %, preferably about 15 weight %.

The indicators described herein can be sterilized by conventional methods without degrading or otherwise damaging them. Further, the indicator caps described herein can be sterilized by conventional methods without degrading or otherwise damaging the freeze indicator. Convention sterilization methods can include, but are not limited to sonication, gamma radiation, ethylene oxide sterilization, autoclave, and the like.

The freeze indicators and indication caps described can be processed thorough existing processing lines without an impact on the speed of production or at substantially the same speed. Any modification to the processing line can be within the range of setup adjustment. For example, an existing processing line can produce capped vials using the herein described freeze indication caps at greater than about 80%, greater than about 90%, greater than about 95%, greater than about 96%, greater than about 97%, greater than about 98%, greater than about 99% of the speed of existing capping.

Manufacturing can be performed by a single party or multiple parties.

Example 1

A tube with wall thickness 0.5 mm, internal diameter 5.3 mm and a straight closed end also 0.5 mm thick was obtained. It was cut 2 mm from the outside end surface so it was 1.5 mm deep and 5.0 mm wide. This piece was adhered to the center of the top side of the flip top. A smaller polypropylene tube of 5.4 mm outside diameter with 0.5 mm diameter walls and with a rounded closed end was cut so that the straight side of the tube was about 2 mm long, and the external height was about 3.3 mm. Because of the rounding it had a depth of about 2.8 mm.

The larger diameter item was used as the cup and the other item the closure. 35 µL of water was placed in the cup using a micro-syringe. When attempts were made to insert the closure into the cup water was displaced and a large air bubble was captured in the closed container. This orientation is not favorable.

Example 2

The two parts of Example 1 were again prepared. However, this time the smaller diameter item was used as the cup and the larger the closure. 35 µL of slightly translucent colloid from an unexposed FREEZECHECK™ indicator was placed in the cup using a micro-syringe and the parts aligned as illustrated in FIG. 10.

The cup was then inserted into the larger inverted closure. Air escaped from the closure around the sides of the cup and when completely inserted there was little or no included air in the container.

This combination was then bonded by the flat surface in the center of a light blue 15 mm flip top seal (as illustrated in FIG. 11) attached to the aluminum cap crimped to a glass vial.

The color of the flip top was visible through the rounded cup and the colloid it contained. After exposure to freezing conditions (<−4° C. for 5 minutes) the colloid became white opaque and the color of the flip top was no longer visible. The color change was obvious and consistent with FREEZECHECK™ behavior. That is, the item was an operative freeze indicator. Additionally, the flip top seal color was visible from all viewing angles, and the seal remained intact, indicating that it had retained its primary operability. The combination was therefore operable for both primary purposes as well as the additional desired use as a freeze indicator.

Example 3

To reduce the height of the indicator component a 1.4 mm length of the tube with wall thickness 0.5 mm and internal diameter 5.0 mm was cut. It was bonded with adhesive to the center of a light blue flip top seal. A cup was formed and filled as for Example 1. The combined tube and flip top was inverted over the cup, and the two joined as illustrated in FIG. 12. There was no air bubble in the closed container of colloid.

The combined freeze indicator and flip top seal retained the capabilities of both components.

Example 4

Five indicators with capacity 70 µL but otherwise similar to that described in Example 2 were totally filled with distilled water. They were weighed and placed in an oven at 67° C. After 15 days they were removed and reweighed. Each now also had a small bubble. The average weight loss was 4 mg. Using the Mocon estimate for temperature dependence of WVRT (between 5 and 10% decrease per ° C.) the losses at 38° C. in two weeks would be about 0.2 to 1 mg which is comparable to the FREEZECHECK™ itself.

Example 5

Figure 13:
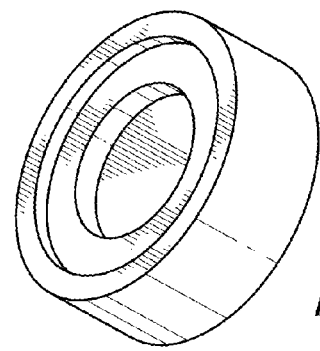
FIG. 13 shows the design of the prototype vial cap of Example 5.

A prototype vial cap similar in size to a standard 15 mm. vial cap, with an 80 microliter cavity, was created on a Stratsys Dimension Elite 3D printer by Cimquest Rapid Prototyping Services in Bedminster, N.J. The prototype was formed from dark green ABS plastic and smoothed out with Plastruct Plastic Weld. FIG. 13 shows the design of the prototype. The cavity was filled with a freeze indicator formulation (see below), and a transparent plastic window punched out from a plastic cover sheet obtained from an office supply was glued on top of the cavity using a quick-setting epoxy resin. After the epoxy resin hardened, the partially cloudy liquid was visible in the cavity. The device was placed in a freezer at −20° C. for about 10 minutes and returned to room temperature. Exposure to freezing temperatures caused the formulation to agglomerate, and the cavity now appeared white, indicating that a freezing event had occurred.

Freeze indicator formulation containing deuterium oxide, latex, and ice nucleating active microorganism was prepared according to U.S. Pat. No. 6,957,623. The latex had particles less than about 0.05 microns, the stabilizing material was glutaraldehyde, and the ice nucleating active microorganism was Snomax® from Snomax International (www.snomax.com).

Example 6

Figure 14:
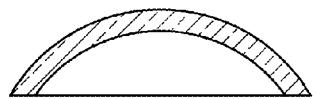
FIG. 14 depicts and example embodiment of a freeze indicator, such as the freeze indicator prepared in Example 6.
Figure 14:
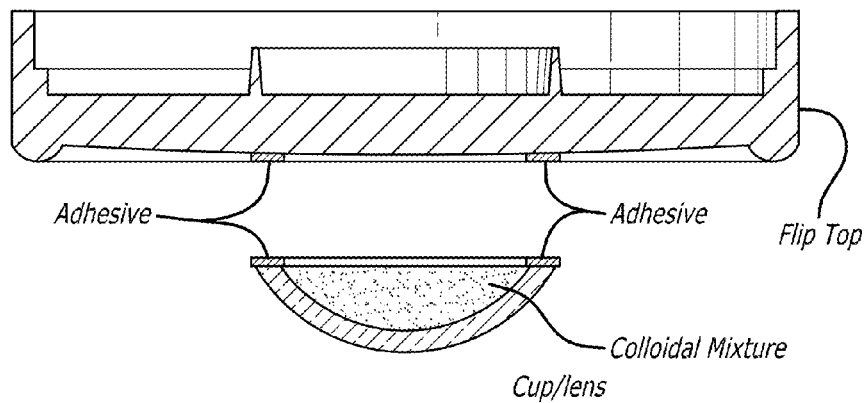
Figure 14:
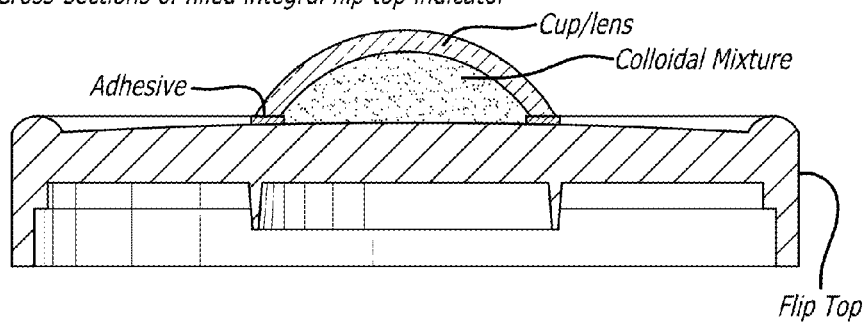
Figure 14:
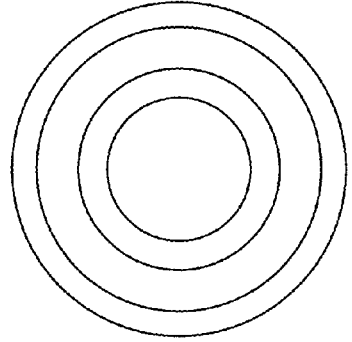
Figure 14:
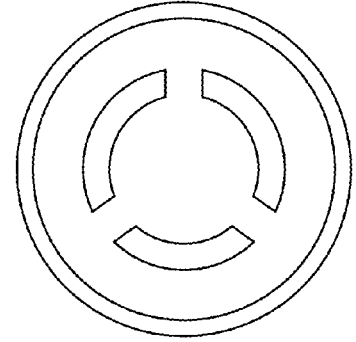

A 10 µl freeze indicator was constructed by cutting the bottom off a rounded extrusion-molded polypropylene item, filling it with an indicator dispersion and then bonding it to an inverted plain cap using an epoxy adhesive. The cap was about 5 mm across, about 1.5 mm deep and had 0.5 mm wall thickness. FIG. 14 depicts the freeze indicator prepared.

Assembling Indicators Lids Using a Conveyor Belt

An example method for filling and closing the integral flip top freeze indicator uses a step and repeat process and a horizontal continuous conveyor with equally spaced cavities or holders for the part that is the cup. There are a series of actions in line that complete the various capabilities. The first step is to place the cup facing up in a conveyor cavity. This may be done manually on a slow machine or by a device on a faster machine. At the next position, the cup is filled with a constant volume dosing device, such as a pump from Fluid Metering, Inc., Sysosset, N.Y. The last position has a device for applying the closure firmly, using, for example, a plunger. The filled and closed items are then removed or discharged from the machine. The combined integral flip top freeze indicator with aluminum cap is attached to the vial and crimped.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above-cited references and printed publications are individually incorporated herein by reference in their entirety.

In closing, it is to be understood that the embodiments disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A container for a perishable product comprising:
   a vial configured to hold the perishable product;
   a lid, removably coupled to the vial, and having an inner surface configured to contact the vial, and a top surface opposite the inner surface; and
   a temperature condition indicator comprising a threshold temperature conditional indicator, disposed upon the top surface;
   wherein the temperature condition indicator comprises:
      a cup;
      a liquid formulation, contained in the cup, that will irreversibly change appearance when exposed to a temperature condition; and
      a cover, disposed over the cup, wherein the cover is sufficiently transparent that a change in appearance of the liquid formulation that results from exposure to the temperature condition is detectable through the cover;
      wherein the liquid formulation is visible through the cover before the temperature condition occurs; and
      wherein the cup, liquid formulation, and cover are configured and assembled to minimize the presence of bubbles in the liquid formulation.

2. The container of claim 1, wherein the temperature condition indicator comprises water and a hydrophobic material, a colorant, or a reactive agent that changes color upon reaction.

3. The container of claim 1, wherein the cup has a volume of about 1 μL to about 150 μL.

4. The container of claim 1, wherein the cover has a viewing area of about 0.5 mm$^2$ to about 80 mm$^2$.

5. The container of claim 1, wherein the cup has a depth of about 0.1 mm to about 2 mm.

6. A vial for a perishable product comprising:
   a temperature condition indicator comprising a threshold temperature condition indicator, the temperature condition indicator comprising:

a cup;

a liquid formulation, contained in the cup, that will irreversibly change appearance when exposed to a temperature condition; and a cover, disposed over the cup, wherein the cover is sufficiently transparent that a change in appearance of the liquid formulation that results from exposure to the temperature condition is detectable through the cover;

wherein the liquid formulation is visible through the cover before the temperature condition occurs; and wherein the cup, liquid formulation, and cover are configured and assembled to minimize the presence of bubbles in the liquid formulation; and wherein the temperature condition indicator is located on a lid of the vial, on a label affixed to the vial, or on a bottom surface of the vial.

7. The vial of claim 6, wherein the liquid formulation is a freeze indicator formulation.

8. The vial of claim 7, wherein the lid has a clear covering to allow viewing of the freeze indicator formulation.

9. The vial of claim 6, wherein a freeze indicator formulation is contained within a self-adhesive indicator affixed to the lid, a vial body or the bottom of the vial.

10. The vial of claim 6, wherein the label is attached to the lid, a vial body, or the bottom.

11. The vial of claim 10, wherein the label is a flexible blister having a volume that is about 5 microliters or less than 5 microliters.

12. The vial of claim 6, wherein the temperature condition indicator is a binary indicator.

13. The vial of claim 6, wherein the temperature condition indicator is not a binary indicator, so that quantitative damage to a product in the vial can be detected.

14. The vial of claim 6, wherein the temperature condition indicator indicates a temperature condition at about or below the freezing temperature of a solution contained in the vial.

15. The vial of claim 6, wherein the temperature condition indicator indicates a temperature condition at about or above the freezing temperature of a solution contained in the vial.

16. The vial of claim 6, wherein an additional temperature condition indicator is included unattached to the vial so that the additional temperature condition indicator can be applied in the event that the temperature condition indicator of the lid, label, or bottom is removed.

17. The vial of claim 6, wherein the temperature condition indicator undergoes a change in color to denote a temperature condition.

18. The vial of claim 6, wherein the temperature condition is not detected by a change in color of the temperature condition indicator.

19. The vial of claim 6, wherein the temperature condition indicator comprises a liquid media, a gel media, a solid state media, a mixture of a liquid and a gel media, a mixture of a gel and a solid state media, or a mixture of a liquid and a solid state media.

* * * * *